US012470858B2

(12) United States Patent
Harris

(10) Patent No.: US 12,470,858 B2
(45) Date of Patent: Nov. 11, 2025

(54) IN-EAR ACOUSTIC DEVICE WITH TRANSPARENCY AND NOISE-CANCELLATION

(71) Applicant: Google LLC, Mountain View, CA (US)

(72) Inventor: Neil Harris, Cambridge (GB)

(73) Assignee: GOOGLE LLC, Mountain View, CA (US)

( * ) Notice: Subject to any disclaimer, the term of this patent is extended or adjusted under 35 U.S.C. 154(b) by 164 days.

(21) Appl. No.: 18/528,060

(22) Filed: Dec. 4, 2023

(65) Prior Publication Data

US 2025/0184644 A1 Jun. 5, 2025

(51) Int. Cl.
*H04R 25/00* (2006.01)
*H04R 1/10* (2006.01)

(52) U.S. Cl.
CPC ......... *H04R 1/1016* (2013.01); *H04R 1/1066* (2013.01); *H04R 1/1083* (2013.01); *H04R 2430/01* (2013.01); *H04R 2460/01* (2013.01)

(58) Field of Classification Search
CPC ... H04R 1/1016; H04R 1/1066; H04R 1/1083
See application file for complete search history.

(56) References Cited

U.S. PATENT DOCUMENTS

| | | | | |
|---|---|---|---|---|
| 11,206,471 | B1 * | 12/2021 | Seo | H04R 1/1016 |
| 12,149,877 | B2 * | 11/2024 | Lee | H04R 1/1075 |
| 2022/0014836 | A1 * | 1/2022 | Liang | H04R 1/1058 |
| 2023/0269514 | A1 * | 8/2023 | Cousins | H04R 1/1025 381/74 |
| 2025/0088791 | A1 * | 3/2025 | Grazian | H04R 1/025 |

* cited by examiner

*Primary Examiner* — Simon King
(74) *Attorney, Agent, or Firm* — DORITY & MANNING P.A.

(57) ABSTRACT

Systems, devices, methods, and non-transitory, machine-readable media may correspond to in-ear acoustic devices, such as an earbud, with transparency and noise-cancellation. The earbud may include one or a combination of the following. A housing may include a first section and a second section. A speaker may be housed by the housing. A first volume may be partially defined by the speaker and the first section. A second volume may be partially defined by the speaker and the second section. A bypass duct may fluidically connect the first volume with the second volume. The bypass duct may include a vent to outside of the housing.

20 Claims, 9 Drawing Sheets

IN-EAR ACOUSTIC DEVICE WITH TRANSPARENCY AND NOISE-CANCELLATION

TECHNICAL FIELD

This disclosure generally relates to acoustic devices and particularly to in-ear acoustic devices with transparency and noise-cancellation.

BACKGROUND

In earbud design, there may be two competing issues in a high-tech earbud: achieving good noise-cancellation and achieving a high comfort level that allows a user to comfortably wear the earbud for an extended time. Good noise-cancellation may be facilitated by high levels of occlusion. However, a primary impediment to comfort may be occlusion. To facilitate comfort, an earbud may be formed to have high transparency so that earbud feels natural such that the user is almost unaware that the user is wearing it. The greater the transparency is, the longer the user can comfortably wear it. To have good transparency, a very open design may be desirable, but, to have good noise control, a very closed design may be desirable. Achieving good noise-cancellation while achieving a high comfort level may be a major challenge.

Thus, there is a need for devices and methods that address the foregoing problems. This and other needs are addressed by the present disclosure.

BRIEF SUMMARY

Certain embodiments according to the present disclosure relate generally to acoustic devices and more particularly to systems, devices, methods, and non-transitory, machine-readable media corresponding to in-ear acoustic devices with transparency and noise-cancellation.

In one aspect, an earbud may include one or a combination of the following. A housing may include a first section and a second section. A speaker may be housed by the housing. A first volume may be partially defined by the speaker and the first section. A second volume may be partially defined by the speaker and the second section. A bypass duct may fluidically connect the first volume with the second volume. The bypass duct may include a vent to outside of the housing.

In another aspect, a method of configuring an earbud may include one or a combination of the following. A first section of a housing and a second section of the housing may be arranged. A speaker and the first section may be arranged so that a first volume is partially defined by the speaker and the first section. The speaker and the second section may be arranged so that a second volume is partially defined by the speaker and the second section. The first volume may be fluidically connected with the second volume with a bypass duct. The bypass duct may include a vent to outside of the housing.

In various embodiments, the bypass duct may further include a first inlet to the first volume at a first end of the bypass duct and a second inlet to the second volume at a second end of the bypass duct. The first inlet may not be directly opposite of the second inlet. In various embodiments, the first inlet and the second inlet may be disposed at different positions with respect to an axis of the speaker. In various embodiments, the bypass duct may further include a middle section between the first end of the bypass duct and the second end of the bypass duct. The middle section may be adjacent to the speaker. In various embodiments, the middle section of the bypass duct may be disposed behind the speaker. In various embodiments, the middle section of the bypass may be disposed at a side of the speaker. In various embodiments, the middle section may be curved. In various embodiments, the vent may be disposed at or near a portion of the bypass duct that corresponds to a pressure minimum during speaker operation. In various embodiments, the bypass duct may further include a first elbow near the first end of the bypass duct and a second elbow near the second end of the bypass duct.

In various embodiments, the vent may be formed with a T-shaped portion that defines a port. In various embodiments, during operation of the speaker, pressure at the vent may be zero or low with respect to other portions of the bypass duct. In various embodiments, the housing may further include a third section that is between the first section and the second section. In various embodiments, the vent may be disposed at least partially in the third section. In various embodiments, the vent may be disposed between the first volume and the second volume. In various embodiments, the vent may be the only vent to the outside of the earbud. In various embodiments, the earbud may be configured to perform anti-noise cancellation.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Disclosed embodiments herein may address and solve major challenges to achieving good noise cancellation while achieving a high comfort level in earbud design. Disclosed embodiments may improve noise cancellation and allow for more transparency. Disclosed embodiments may place the rear vent at the neutral point between the opposite polarities of the front and rear volume pressures to minimize leakage while allowing good transparency and low occlusion. Low leakage may allow an external microphone to be nearer to vent, improving active noise cancellation (ANC) and active transparency processing. Further details regarding such embodiments and others are provided in relation to the figures.

Figure 1:
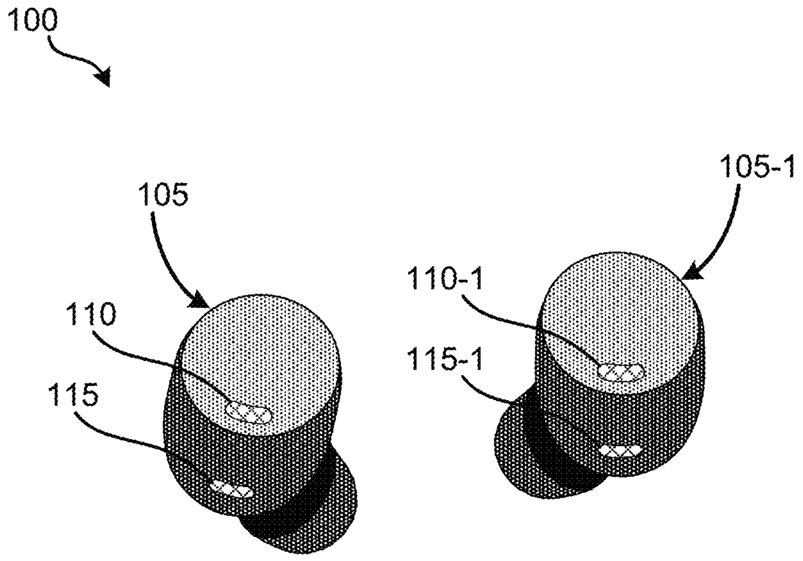
FIG. 1 illustrates a pair of earbuds.

FIG. 1 illustrates a pair of earbuds 100, including earbud 105 and earbud 105-1. Each earbud 105, 105-1 may include one or more vents 110, 110-1, 115, 115-1 from one or more interior volumes to the outside. Acoustic tuning may be achieved by resistive vents 110, 110-1, 115, 115-1 leaking pressure. This may be done in three ways. Firstly, an earbud 105 may be formed with a vent 110 to the outside from the volume behind the speaker element. Secondly, an earbud 105 may be formed with a vent 115 to the outside from the volume in front of the speaker element. Thirdly, as disclosed further herein, an earbud may be formed with a vent between the volumes in front of and behind the speaker element. The nub of the problem may be that vents to the outside cause leakage, but they may be necessary for transparency and to reduce occlusion effects.

Figure 2:
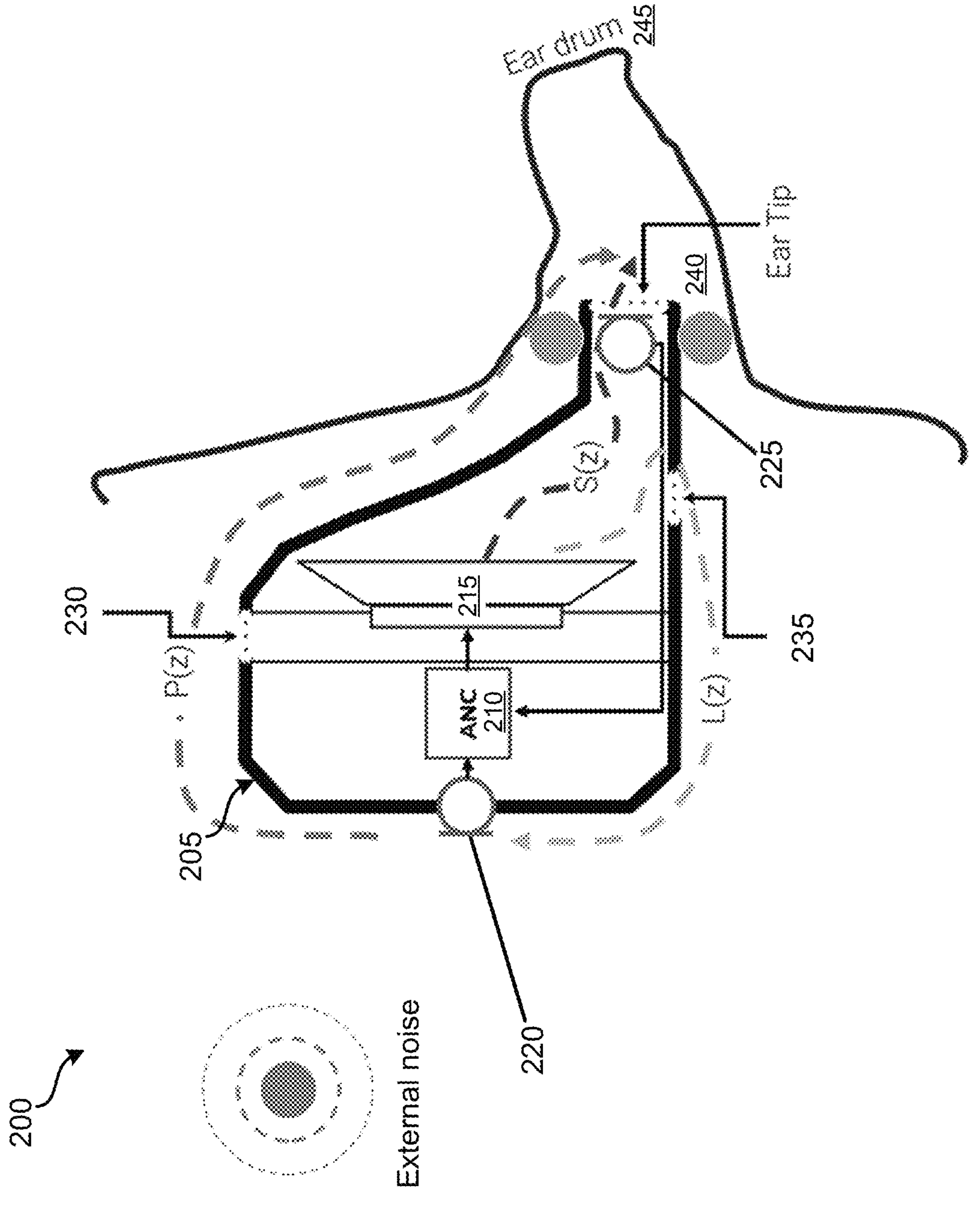
FIG. 2 illustrates an adaptive noise cancelling system that includes an audio device, such as an earbud.

FIG. 2 illustrates an adaptive noise cancelling system 200 that includes an audio device, such as an earbud 205. Some components of the earbud 205 are illustrated. Most components of the earbud 205 may be housed by a housing, which may be made from a rigid or semi-rigid material. The earbud 205 may be shaped to be at least partially inserted into a user's ear canal 240 so that it will stay in place near the user's eardrum 245 during normal body movements.

The earbud 205 may include audio processing circuitry, such as ANC circuitry 210. The ANC circuitry 210 may include, for example, a digital signal processor (DSP), a digital to analog converter (DAC), an amplifier, and other components, and may be coupled to a loudspeaker 215, a reference microphone 220, an error microphone 225 (which may also be referenced as a feedback microphone), and other components. The earbud 205 may further include a wireless interface, a processing system, and other components.

The wireless interface may be a short-range wireless interface that allows for a device-to-device exchange of data and may be a Bluetooth interface that allows for data to be exchanged according to a Bluetooth communication standard, such as classic Bluetooth, BLE, or LE audio. The processing system may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM) or a solid-state drive (SSD).

Illustrated in FIG. 2 are three acoustic paths: a primary noise path P(z), a leakage path from speaker to external source L(z), and a secondary path from speaker to eardrum reference point S(z). The depicted example includes two vents: a rear port 230 and a front port 235. In some embodiments, by combining the rear port 230 and the front port 235 in the earbud device 205, the relationship between the P(z) and the L(z)/S(z) may be decoupled. Some embodiments, such as those disclosed further herein, may have a different number of vents to the outside world (e.g., only one vent).

In operation, a listener may hear external noise through the housing and components of the earbud 205. To cancel the external noise, the reference microphone 220 may sense the external noise and produce a reference signal that may be fed through an analog-to-digital converter (ADC) to the DSP. The DSP may generate an anti-noise signal, which is fed through the DAC and the amplifier to the loudspeaker 215 to generate anti-noise in a noise cancellation zone. The external noise may be cancelled in the noise cancellation zone when the anti-noise is equal in magnitude and opposite in phase to the external noise in the noise cancellation zone. The resulting mixture of noise and anti-noise may be captured by the error microphone 225, which may generate an error signal to measure the effectiveness of the noise cancellation. The error signal may be fed through the ADC to the DSP, which may adjust the magnitude and phase of the anti-noise signal to minimize the error signal within the cancellation zone (e.g., drive the error signal to zero). In some embodiments, the loudspeaker 215 may also generate desired audio (e.g., music), which may be received by the error microphone 225 and removed from the error signal during processing.

To reduce pressure in the rear area behind the loudspeaker 215, a vent such as the rear port 230 may be formed in the earbud 205 to vent air to the outside world. This may reduce leakage, but, due to positive and negative pressures, there may be phase effects if not designed carefully. Additionally or alternatively, some embodiments may have a vent in the area in front of the loudspeaker 215, a vent such as the front port 235 may be formed in the earbud 205 to vent air to the outside world. In such embodiments, placement of the error microphone 225 with respect to the front vent matters. If the error microphone 225 is close to the vent and/or the loudspeaker 215, the error microphone 225 may be close to two acoustic paths, including the leakage path. Due to the signal leakage through the vent, feedback problems may occur such that bandwidth may need to be limited. So, the error microphone 225 may better placed nearer the eardrum 245. Rather than having two vents, some embodiments may have only one vent coming off a bypass duct that is connecting the area in front of the loudspeaker with the area behind the loudspeaker, as described in relation to the following figures.

Figure 3:
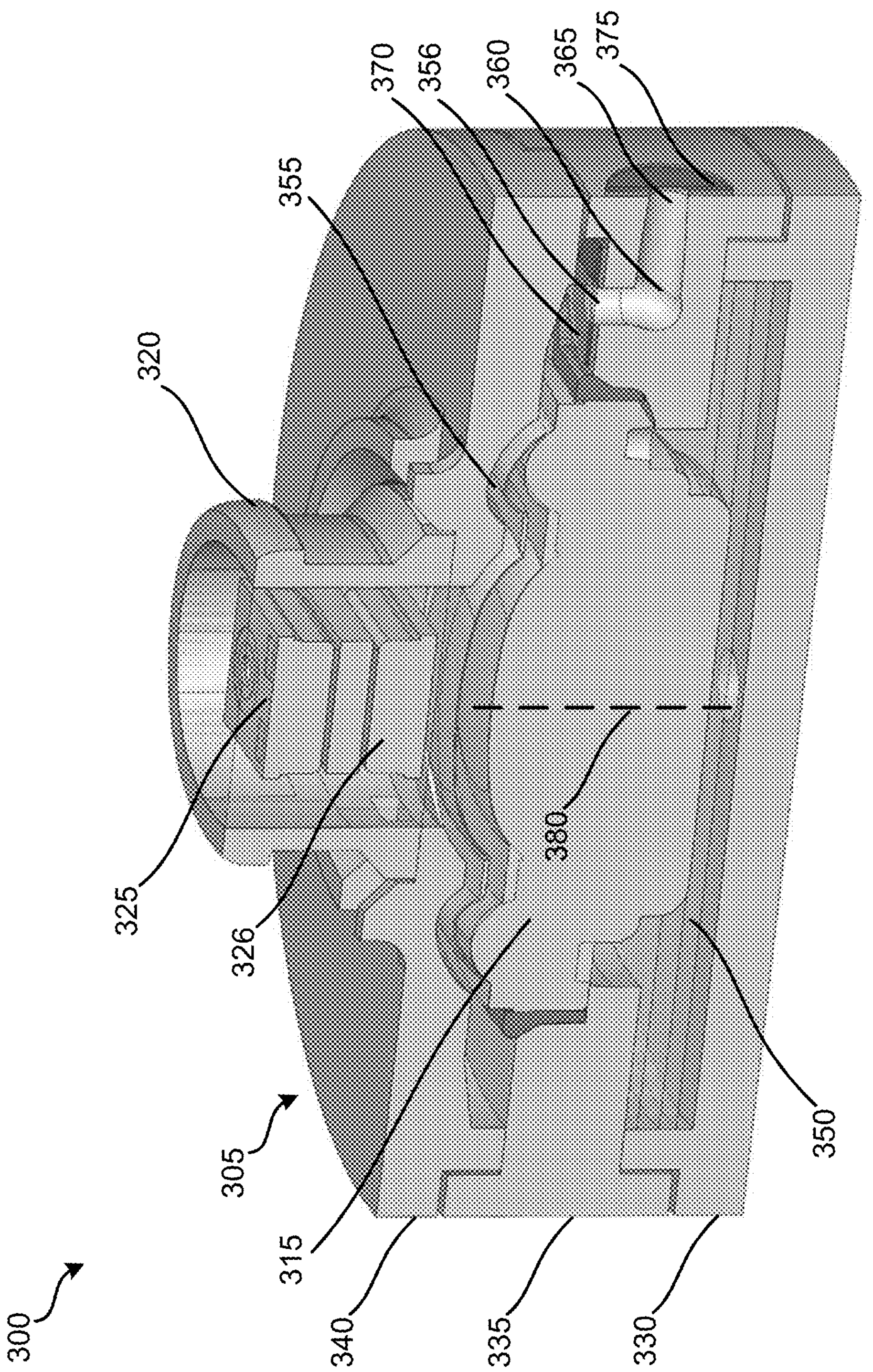
FIG. 3 illustrates a cross-section of an earbud formed with a vent between the volumes in front of, and behind, a loudspeaker, in accordance with embodiments according to the present disclosure.

FIG. 3 illustrates a cross-section 300 of an earbud 305 formed with a vent 365 between the volumes in front of, and behind, a loudspeaker 315, in accordance with embodiments according to the present disclosure. The earbud 305 may include multiple housing sections: a first housing section 330 that may correspond to the bottom housing section 330 in the orientation depicted, a second housing section 340 that may correspond to the top housing section 340 in the orientation depicted, and a third housing section 335 that may correspond to the middle housing section 335 between the first housing section 330 and the second housing section 340. With some embodiments such as the one depicted, the earbud 305 may include multiple feedback microphones. In some embodiments, the feedback microphones may be disposed with a snout 320 of the earbud 305 that is formed to fit within an ear canal. The earbud 305 may include a feedback microphone 325 facing outward toward the exterior end of the snout 320 and a feedback microphone 326 facing inward toward the loudspeaker 315. Other embodiments may include a different number of feedback microphones.

As illustrated in the example cross-section 300, the earbud 305 may define a rear volume 350 that is on one side of the loudspeaker 315 that may correspond to a chamber to the rear of the loudspeaker 315. The earbud 305 may also define a front volume 355 that is on the other side of the loudspeaker 315, to the front of the loudspeaker 315. A bypass duct 360 may fluidically connect the rear volume 350 to the front volume 355, as partially shown for example in FIG. 3 and as further indicated in the following figures such as FIGS. 4, 6, and 8. Only part of the bypass duct 360 is visible in the cross-section 300 of FIG. 3; additional aspects of the bypass duct 360 are disclosed herein.

Figure 6:
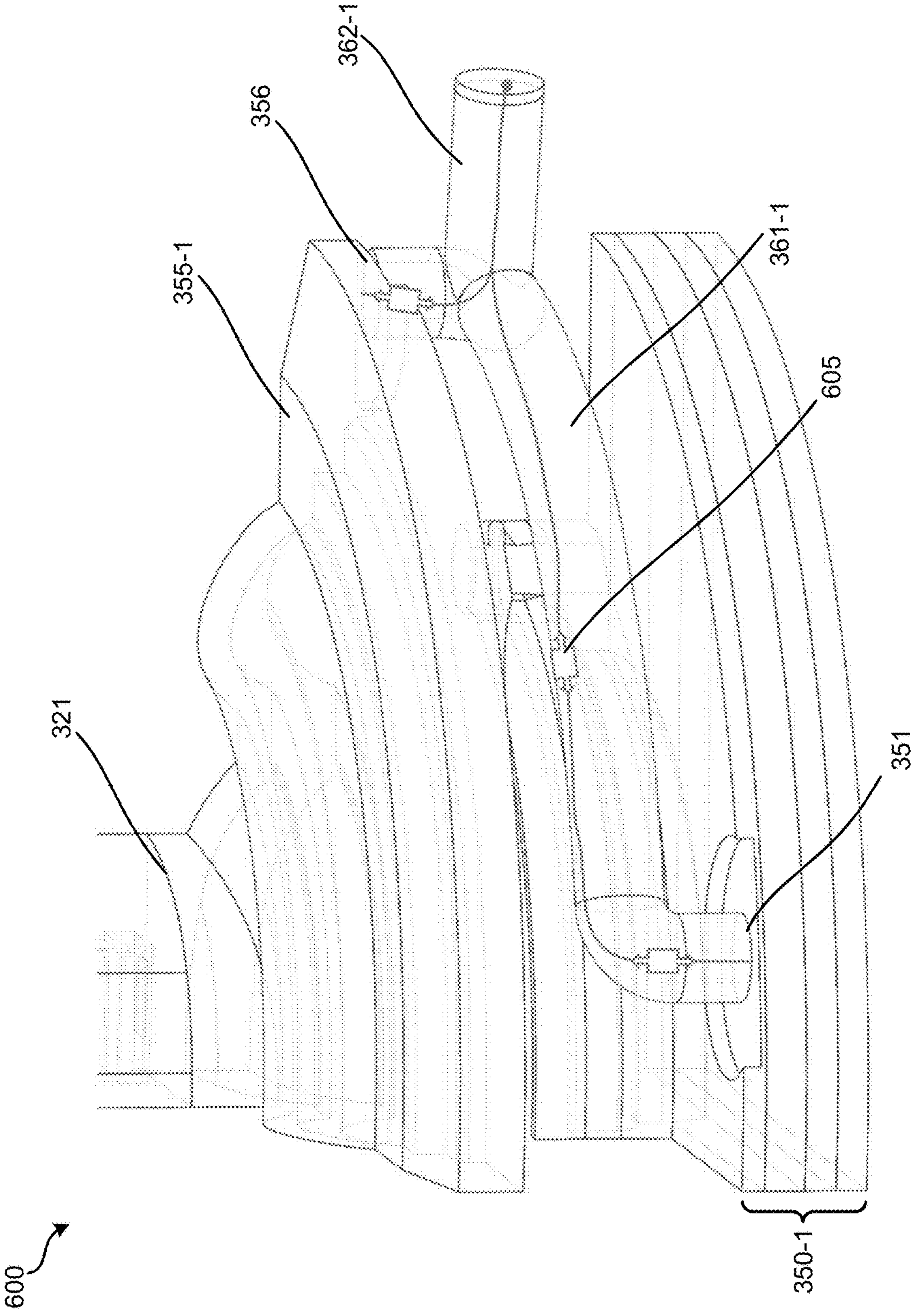
FIG. 6 illustrates an air model showing pressure flow between the rear volume and the front volume during operation of the loudspeaker, in accordance with embodiments according to the present disclosure.

The bypass duct 360 may include a front volume bypass inlet 356 (FIG. 3) at one end of the bypass duct 360 that corresponds to an opening of the bypass duct 360 to the front volume 355. A front volume mesh 370 may cover the front volume bypass inlet 356. The bypass duct 360 may also include a rear volume bypass inlet 351 (FIG. 6) at another end of the bypass duct 360 that corresponds to an opening of the bypass duct 360 to the rear volume 350 (FIG. 3, FIG. 6). As depicted in following figures, the front volume bypass inlet 356 is not aligned directly opposite of the rear volume bypass inlet 351.

The bypass duct 360 may include the vent 365 to the outside. The vent may be disposed at or near an elbow of the bypass duct 360 that is near the front volume bypass inlet 356. To define the vent 365, the bypass duct 360 may be formed with a T-shaped portion that defines a port (a "T-port") to provide transparency from the outside world to inside the earbud 305. A bypass volume mesh 375 may cover the end of the vent 365. In some embodiments, the vent 365 may be the only vent in the earbud 305.

Accordingly, the bypass duct 360 may connect the rear volume 350 to the front volume 355 and may further provide the vent 365 to the outside of the earbud 305. The vent 365 may be critically placed at a position where pressures are very low relative to other portions of the bypass duct 360. With respect to the rear volume 350 and the front volume 355, the vent may be between the rear volume 350 and the front volume 355.

Such a configuration may allow for reduced leakage. The worst-case leakage results may occur when the external microphone 220 is immediately at a vent exit. Moving external microphone 220 away from the vent 365 when the vent is in the middle of the housing, for example, may further reduce the amount of leakage. With the bypass duct 360 disclosed herein, near-perfect coherence between the external microphone 220 and the drum reference point for diffuse P(z) may be achieved.

Such a configuration may also allow for placing the one or more microphones 325, 326 closer to the vent 365, which may result in improved coherence and bandwidth with ANC up to high bandwidth. The microphones may sample external pressures. If the sample point is close to the vent 375, then the mic signal may be strongly correlated to the signal entering the ear canal. If it is distant from the vent, then the correlation may be reduced, especially at higher frequencies. This may limit the bandwidth and the depth of feed-forward ANC that may be achieved. Also, because the vent 365 is at a low-pressure point, improved transparency and passive noise control may be achieved without negatively impact other system performance characteristics.

Figure 4:
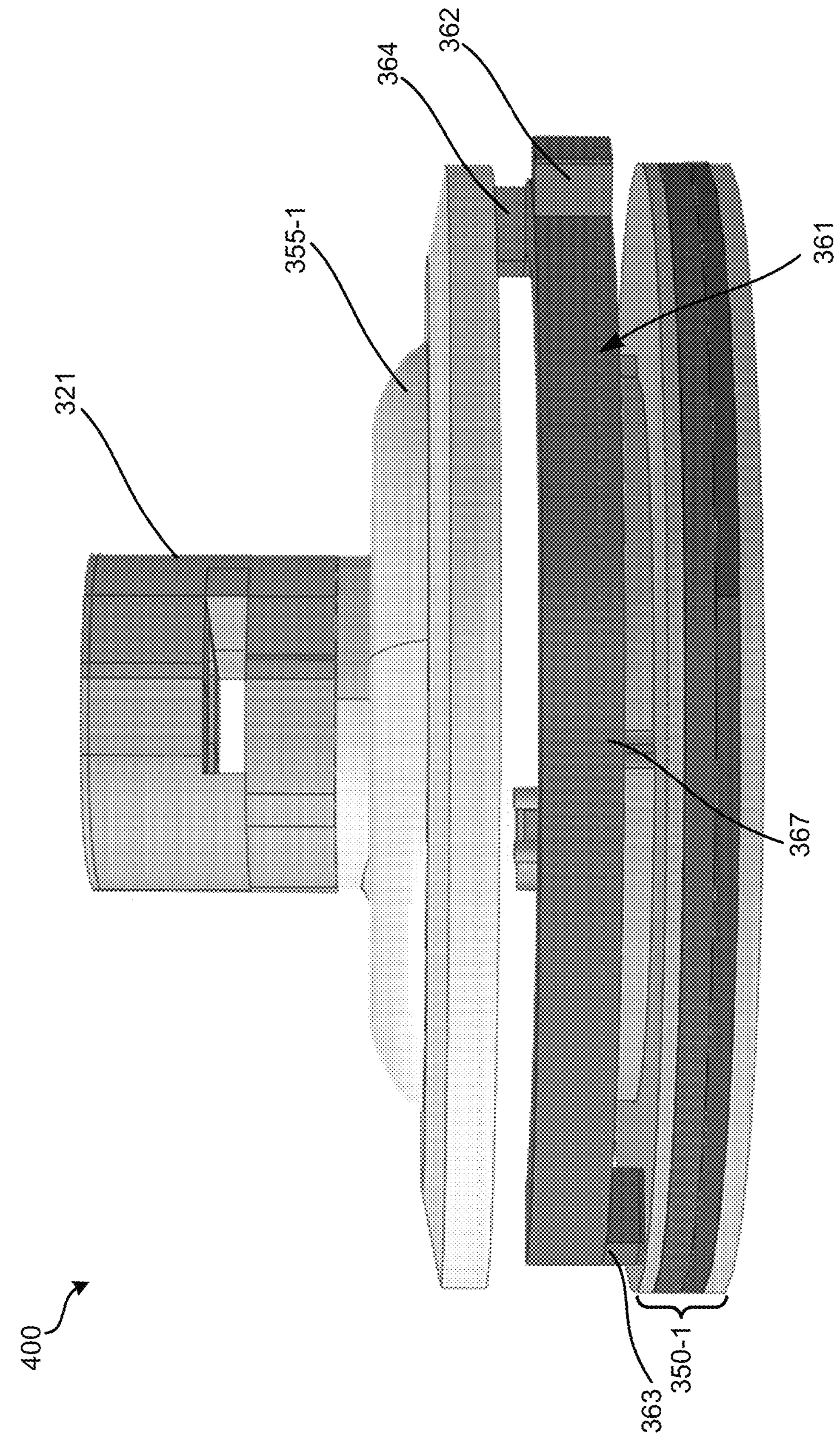
FIG. 4 illustrates an air model of the earbud, in accordance with embodiments according to the present disclosure.

FIG. 4 illustrates an air model 400 of volumes of air within the earbud 305, in accordance with embodiments according to the present disclosure. The air model 400 represents different volumes within the earbud 305, including the rear volume 350-1 and the front volume 355-1. Further illustrated are a bypass duct volume 361 corresponding to the volume within the bypass duct 360, including a portion 362 of the bypass duct volume 361 corresponding to the vent 365. A snout volume 321 may correspond to the volume within the snout 320. With the loudspeaker 315 generally in the middle of the earbud 305 with chambers behind the loudspeaker 315 and in front of it, the two chambers correspond to opposite pressures to some extent.

As indicated by the bypass duct volume 361, the bypass duct 360 may include a first end corresponding to portion 363 and a second end corresponding to portion 364. The bypass duct 360 may further a middle section corresponding to portion 367 that is between the first end and the second end. The middle section may be adjacent to the loudspeaker 315. The middle section may extend in one or more directions generally transverse to an axis 380 of the loudspeaker 315, where the axis 380 extends through the rear and the front of the loudspeaker 315.

In some embodiments, the middle section may abut the loudspeaker 315. In other embodiments, the middle section may not abut the loudspeaker 315 but rather may be disposed at a distance away from the loudspeaker 315. Additionally, in some embodiments, the middle section may be disposed behind the loudspeaker 315. In such embodiments, the middle section may extend at least partially across the rear side of the loudspeaker 315. Additionally or alternatively, the middle section may be disposed to a side of the loudspeaker 315. In such embodiments, the middle section may extend at least partially around a side of the loudspeaker 315. In some embodiments, the middle section may be curved. In various embodiments, the curvature may match one or more curvatures of the loudspeaker 315, the bottom housing section 330, and/or the top housing section 340.

Figure 5:
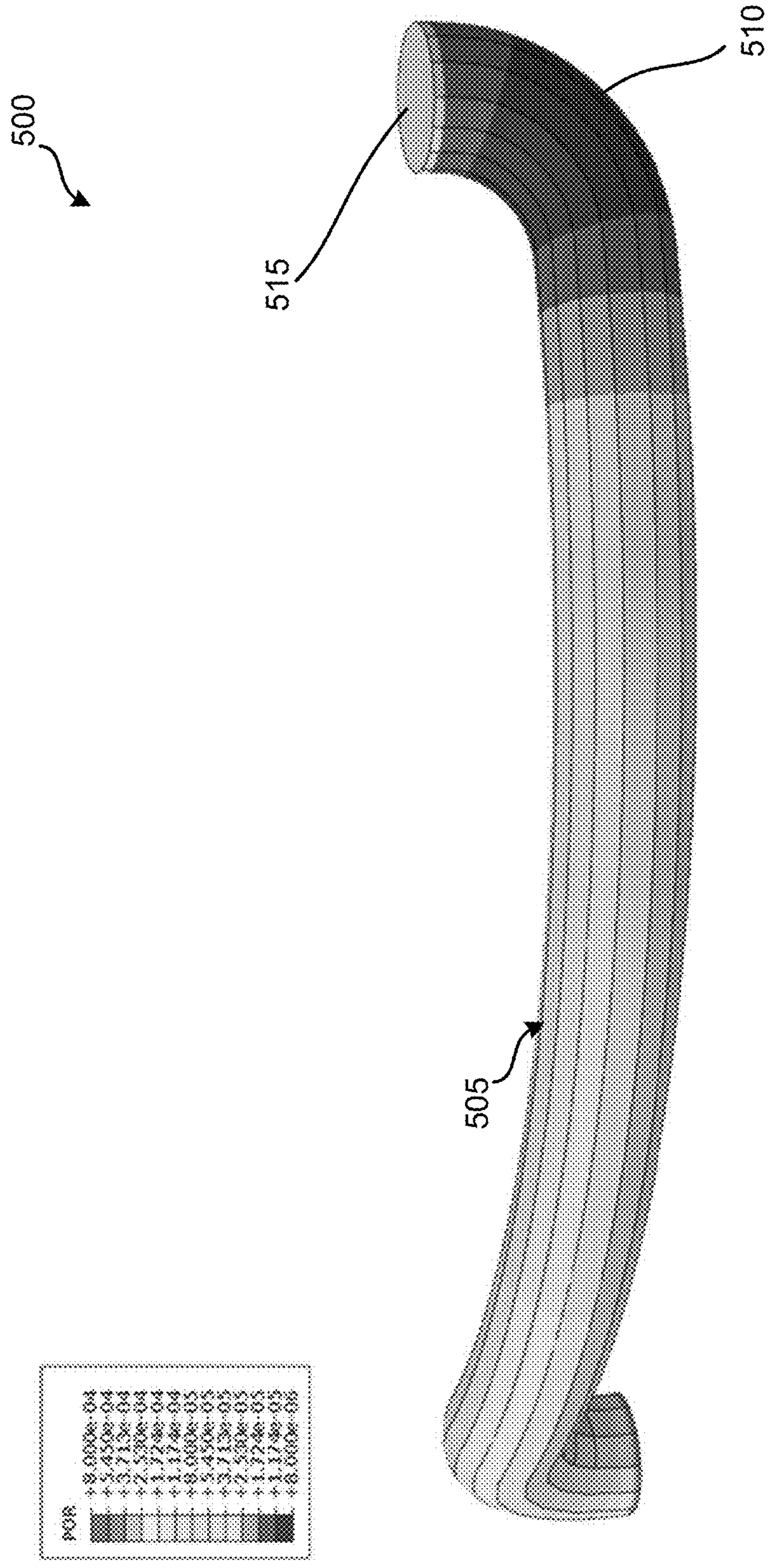
FIG. 5 illustrates a representation of a pressure minimum point of a bypass duct model, in accordance with embodiments according to the present disclosure.

FIG. 5 illustrates a representation 500 of a pressure minimum point 510 of a bypass duct model 505, in accordance with embodiments according to the present disclosure. Under pressure flow analyses, taking into account flow patterns for P(z) and S(z), the pressure minimum point 510 may be observed at the bend of the duct near an end 515 of the duct. The bypass duct model 505 may correspond to a version of the bypass duct 360 that does not include the vent 365.

However, the bypass duct model 505 may illustrate where the vent 365 may be advantageously located. The end 515, for example, may correspond to the front volume bypass inlet 356 that is illustrated, for example, in FIG. 6. The bend of the duct near the end 515 may correspond to one of two elbows in the bypass duct 360, where one elbow is near the rear volume bypass inlet 351 and the other elbow is near the front volume bypass inlet 356 that are illustrated, for example, in FIG. 6. The pressure minimum point 510 may be at elbow near the front volume bypass inlet 356. At or near that pressure minimum point 510, the vent 365 may be formed. Similarly, although not illustrated in the example representation 500, pressure flow analyses of the bypass duct 360 with the vent 365 at the minimum pressure point 510 indicate that only low pressure or no pressure is detected at the portion 362-1 of the bypass duct volume 361-1 corresponding to the vent 365 that is illustrated, for example, in FIG. 6.

FIG. 6 illustrates an air model 600 showing pressure flow between the rear volume 350-1 and the front volume 355-1 during operation of the loudspeaker 315, in accordance with embodiments according to the present disclosure. The air model 600 may generally correspond to the air model 400, including the rear volume 350-1, the front volume 355-1, the snout volume 321, and the bypass duct volume 361-1. The air model 600 further includes a representation of the pressure flow 605 between a rear volume bypass inlet 351 and the front volume bypass inlet 356 during operation of the loudspeaker 315. As indicated, the pressure flow 605 alternates directions between the rear volume bypass inlet 351 and the front volume bypass inlet 356 as the loudspeaker 315 operates. Yet, while the pressure flow 505 alternates, pressure and pressure flow 605 may be zero or near zero (pressure equilibrium) at a portion 362 of the bypass duct volume 361-1 corresponding to the vent 365.

Figure 7:
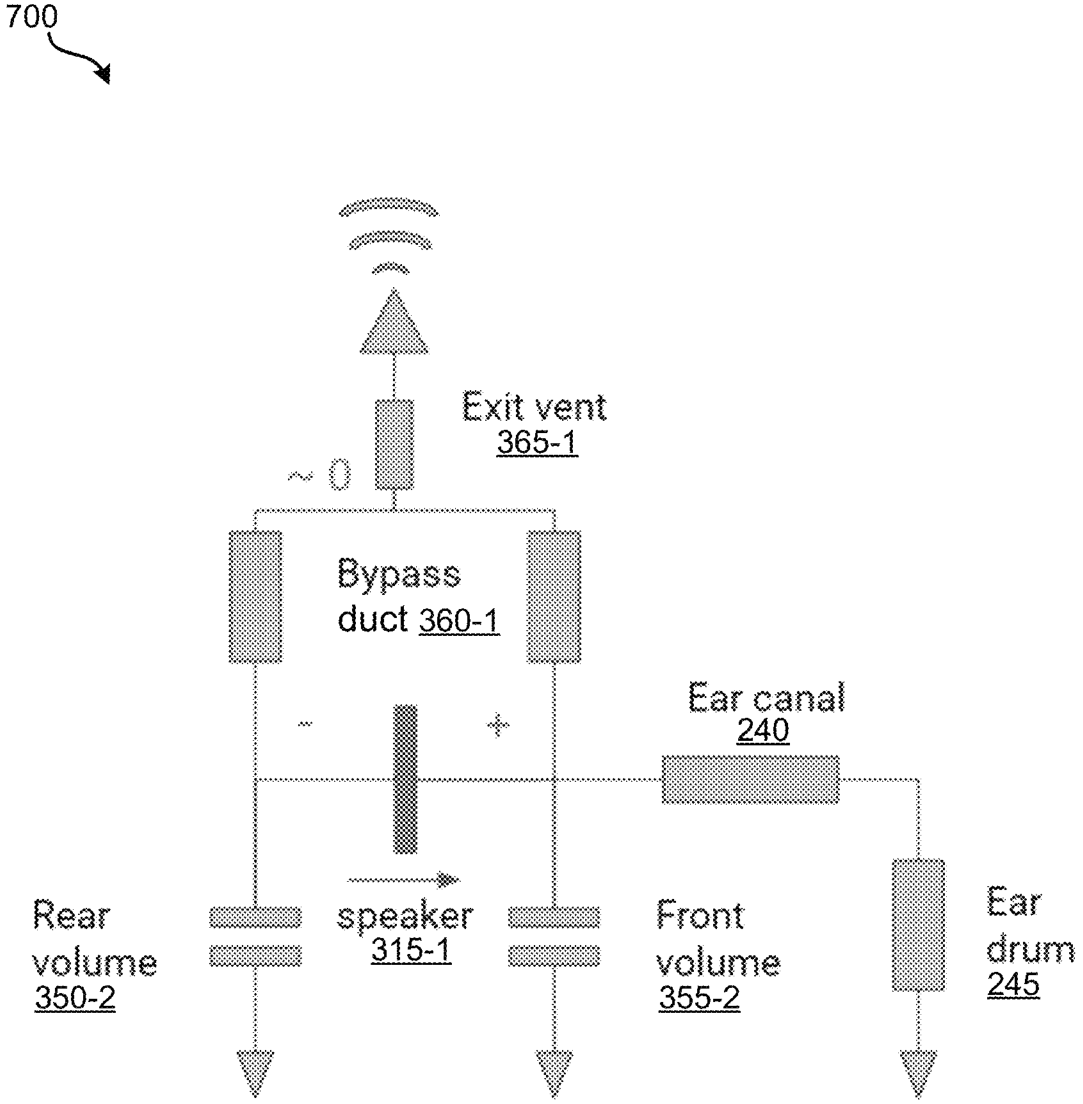
FIG. 7 illustrates a block diagram schematically illustrating elements of the earbud fitted into a user's ear canal near the user's eardrum, in accordance with embodiments according to the present disclosure.

This is further illustrated by FIG. 7. FIG. 7 illustrates a block diagram 700 schematically illustrating elements of the earbud 305 fitted into a user's ear canal 240 near the user's eardrum 245, in accordance with embodiments according to the present disclosure. As indicated, with the positive and negative pressures on either side of the loudspeaker 315-1, the bypass duct 360-1 may allow for approximately zero pressure near the vent 365-1, or non-zero pressure that is lower near the vent 365-1 with respect to other portions of the bypass duct 360-1. With the vent 365-1 by the neutral point that is closer to the front volume bypass inlet 356 of the bypass duct 360-1, where pressure is zero or relatively close to zero, leakage may be minimized, and bandwidth may be improved.

Moreover, this technical solution may allow for a wide range of mesh impedance values of acoustic meshes used with the bypass duct 360-1. The acoustic meshes may include the front volume mesh 370 covering the front volume bypass inlet 356 (illustrated, for example, with respect to FIG. 3), the bypass volume mesh 375 covering the end of the vent 365 (illustrated, for example, with respect to FIG. 3), and the rear volume mesh 366 covering the rear volume bypass inlet 351 (illustrated, for example, with respect to FIG. 8). Thus, S(z) may be tolerant of a wide range of vent impedance values. As such, a wide range of acoustic meshes that control how fast the air flows, in addition to acting as filters, may be used.

Figure 8:
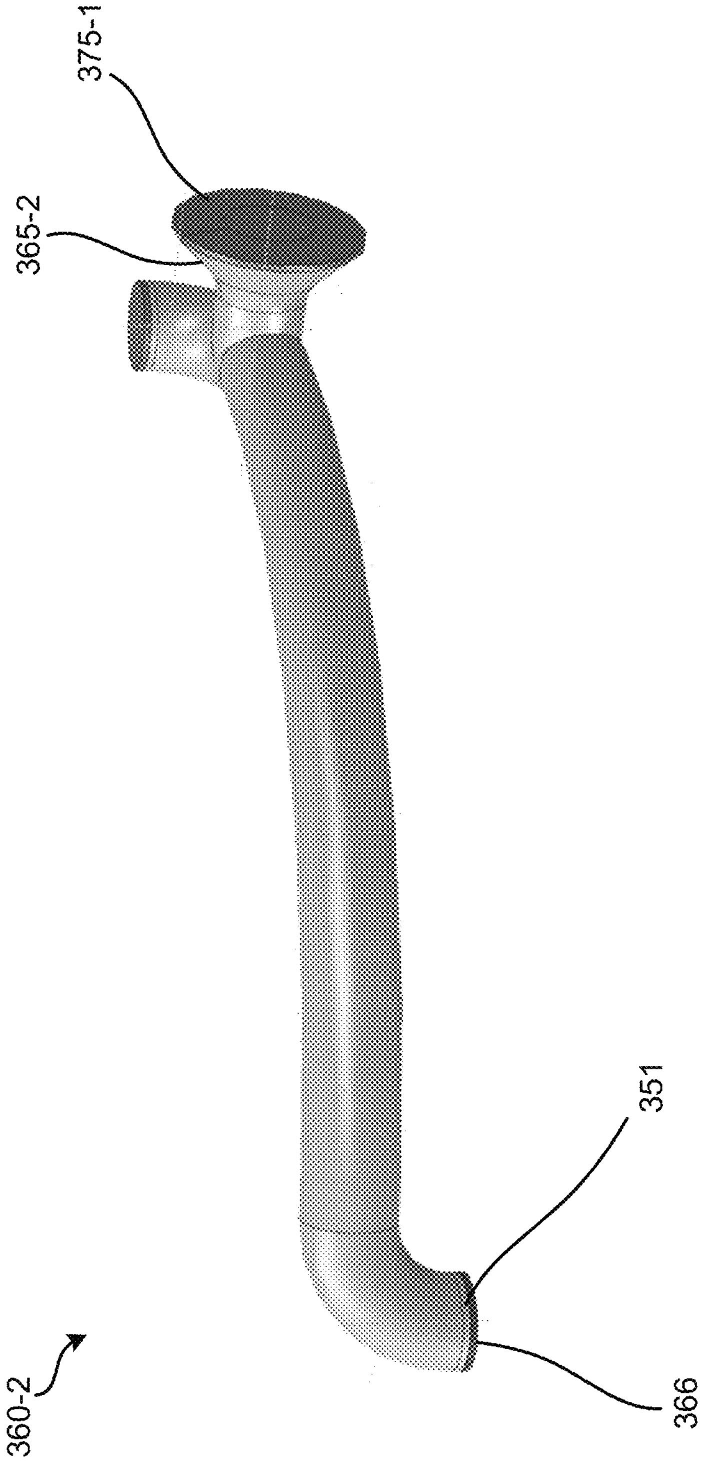
FIG. 8 illustrates a variation of the bypass duct that allows for more transparency, in accordance with embodiments according to the present disclosure.

Some embodiments may provide for even more transparency. FIG. 8 illustrates a variation of the bypass duct 360-2 that allows for more transparency, in accordance with embodiments according to the present disclosure. In such an embodiment, the portion of the bypass duct 360-2 corresponding to the vent 365-2 may expand, flaring out, as it extends away from the main section of the bypass duct 360-2. Thus, this embodiment may have a larger opening at the vent 365-2 exit and may be covered by a larger acoustic mesh 375-1.

Figure 9:
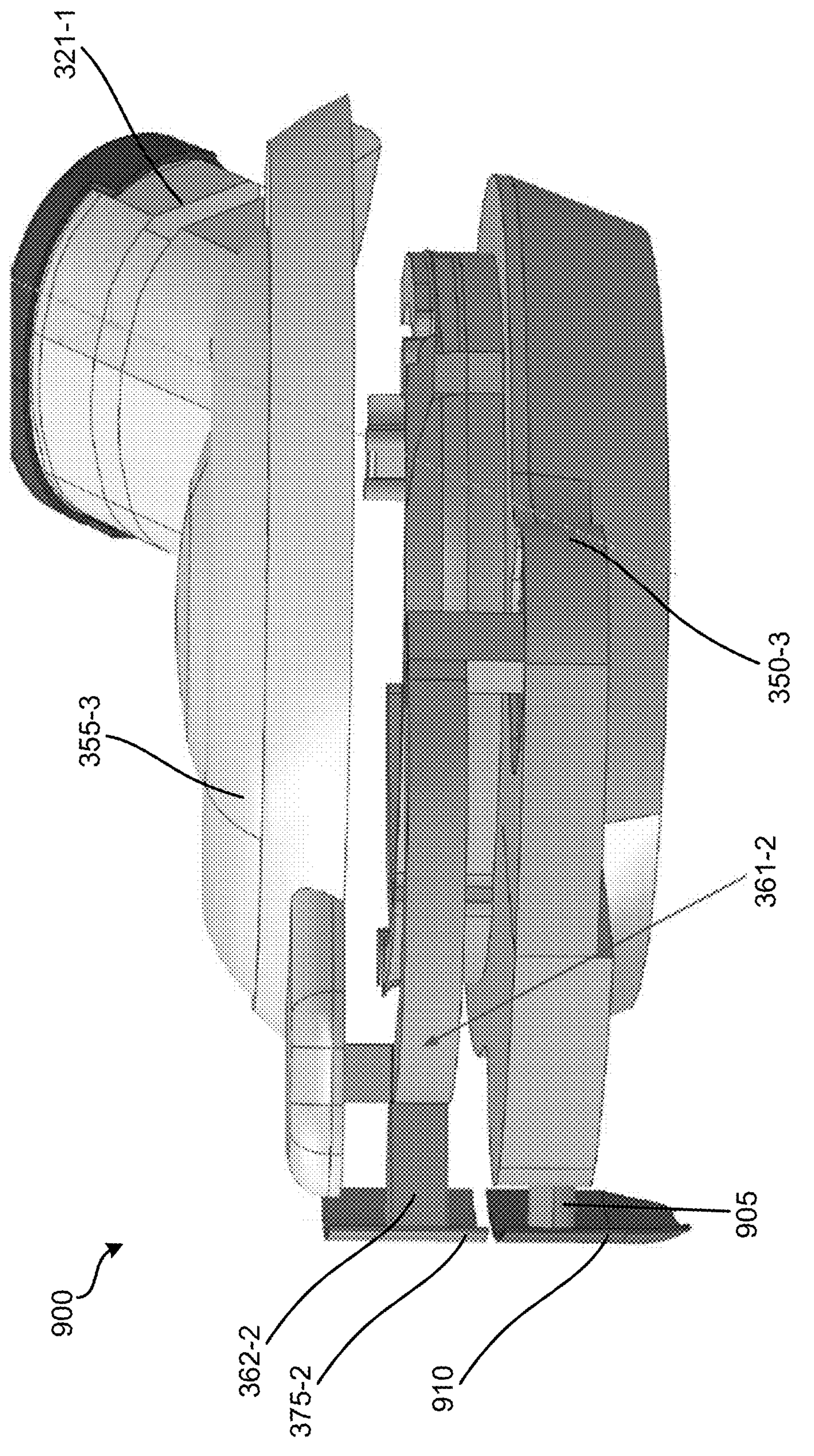
FIG. 9 illustrates an air model of a variation of the earbud that includes a rear leak duct in the rear volume, in accordance with embodiments according to the present disclosure.

Some embodiments may add a small leak in order to offer some additional benefits, particularly at low frequencies. FIG. 9 illustrates an air model 900 of a variation of the earbud 305 that includes a rear leak duct 905 in the rear volume 350-3, in accordance with embodiments according to the present disclosure. The rear leak duct 905 may correspond to a very small vent and may be formed near the portion 362-2 of the bypass duct volume 361-2 corresponding to the vent 365 (illustrated, for example, in FIG. 3). An acoustic mesh 910 like acoustic mesh 375-2 may cover the rear leak duct 905.

Allowing the controlled rear leak 905 may reduce rear cavity stiffness. This may potentially increase low-frequency level below 1 kHz. The leak may give, for example, a 5 dB boost to the secondary response, S(z). An improvement in feedback ANC of similar value may result, while leakage and coherence may remain within acceptable tolerances. The leak may also damp the honk at 1.5 to 2 kHz. Such advantages may be gained without badly affecting leakage or the feed-forward ANC coherence performance as long as the leak is close to the vent 365 of the bypass duct 360 (illustrated, for example, in FIG. 3) and is an order of magnitude more resistive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed:

1. An earbud comprising:

a housing, wherein the housing comprises a first section and a second section;

a speaker housed by the housing;

a first volume, wherein the first volume is partially defined by the speaker and the first section;

a second volume, wherein the second volume is partially defined by the speaker and the second section; and a bypass duct that fluidically connects the first volume with the second volume, wherein the bypass duct comprises a vent to outside of the housing.

2. The earbud as recited in claim 1, wherein the bypass duct further comprises:
a first inlet to the first volume at a first end of the bypass duct; and
a second inlet to the second volume at a second end of the bypass duct;
wherein the first inlet is not directly opposite of the second inlet.

3. The earbud as recited in claim 2, wherein the first inlet and the second inlet are disposed at different positions with respect to an axis of the speaker.

4. The earbud as recited in claim 2, wherein the bypass duct further comprises:
a middle section between the first end of the bypass duct and the second end of the bypass duct, wherein the middle section is adjacent to the speaker.

5. The earbud as recited in claim 4, wherein the middle section of the bypass duct is disposed behind the speaker.

6. The earbud as recited in claim 4, wherein the middle section of the bypass is disposed at a side of the speaker.

7. The earbud as recited in claim 4, wherein the middle section is curved.

8. The earbud as recited in claim 2, wherein the vent is disposed at or near a portion of the bypass duct that corresponds to a pressure minimum during speaker operation.

9. The earbud as recited in claim 2, wherein the bypass duct further comprises:
a first elbow near the first end of the bypass duct; and
a second elbow near the second end of the bypass duct.

10. The earbud as recited in claim 9, wherein the vent is disposed at or near the second elbow of the bypass duct.

11. The earbud as recited in claim 1, wherein the vent is formed with a T-shaped portion that defines a port.

12. The earbud as recited in claim 1, wherein the housing further comprises a third section that is between the first section and the second section.

13. The earbud as recited in claim 12, wherein the vent is disposed at least partially in the third section.

14. The earbud as recited in claim 1, wherein the vent is disposed between the first volume and the second volume.

15. The earbud as recited in claim 1, wherein the vent is the only vent to the outside of the earbud.

16. The earbud as recited in claim 1, wherein the earbud is configured to perform anti-noise cancellation.

17. An earbud comprising:
a housing, wherein the housing comprises a first section and a second section;
a speaker housed by the housing;
a first volume, wherein the first volume is partially defined by the speaker and the first section;
a second volume, wherein the second volume is partially defined by the speaker and the second section; and
a vent to outside of the housing that is positioned at a point between the first volume and the second volume that is at near-zero pressure during operation of the speaker.

18. A method of configuring an earbud comprising:
arranging a first section of a housing and a second section of the housing;
arranging a speaker and the first section so that a first volume is partially defined by the speaker and the first section;
arranging the speaker and the second section so that a second volume is partially defined by the speaker and the second section; and
fluidically connecting the first volume with the second volume with a bypass duct, wherein the bypass duct comprises a vent to outside of the housing.

19. The method of configuring an earbud as recited in claim 18, wherein the bypass duct further comprises:
a first inlet to the first volume at a first end of the bypass duct; and
a second inlet to the second volume at a second end of the bypass duct;
wherein the first inlet is not directly opposite of the second inlet.

20. The method of configuring an earbud as recited in claim 18, wherein the bypass duct further comprises:
a middle section between the first end of the bypass duct and the second end of the bypass duct, wherein the middle section is adjacent to the speaker.

* * * * *